United States Patent

[11] 3,589,208

| | | |
|---|---|---|
| [72] | Inventor | Oreste Brero<br>Turin, Italy |
| [21] | Appl. No. | 833,479 |
| [22] | Filed | June 16, 1969 |
| [45] | Patented | June 29, 1971 |
| [73] | Assignee | S.I.L.A. Societa'Industriale Lavorazione<br>Acciai, S.r.l.<br>Turin, Italy |
| [32] | Priority | June 19, 1968 |
| [33] | | Italy |
| [31] | | 52096A/68 |

[54] DEVICE FOR REMOTELY CONTROLLING THE SETTING OF A REARVIEW MIRROR
4 Claims, 3 Drawing Figs.

[52] U.S. Cl. ................................................. 74/491
[51] Int. Cl. ................................................. G05g 1/08, G05g 7/02

[50] Field of Search ......... ................... 74/491, 504, 501; 350/289

[56] References Cited
UNITED STATES PATENTS

| 2,917,972 | 12/1959 | Bonaguro ................ | 74/491 X |
| 2,919,599 | 1/1960 | Milton et al. ............ | 74/491 X |

*Primary Examiner*—Milton Kaufman
*Attorney*—Sughrue, Rothwell, Mion, Zinn and MacPeak

ABSTRACT: A swivelable external rearview mirror is adjustable by remote control from a driver's position. The mirror has attached thereto a rearwardly extending rod located at its free end in a spiral groove in a fixed plate. The rod can be moved along the groove by a rotatable crank member controlled by the driver, for example by way of a flexible torque transmitting cable, to adjust the angular setting of the mirror.

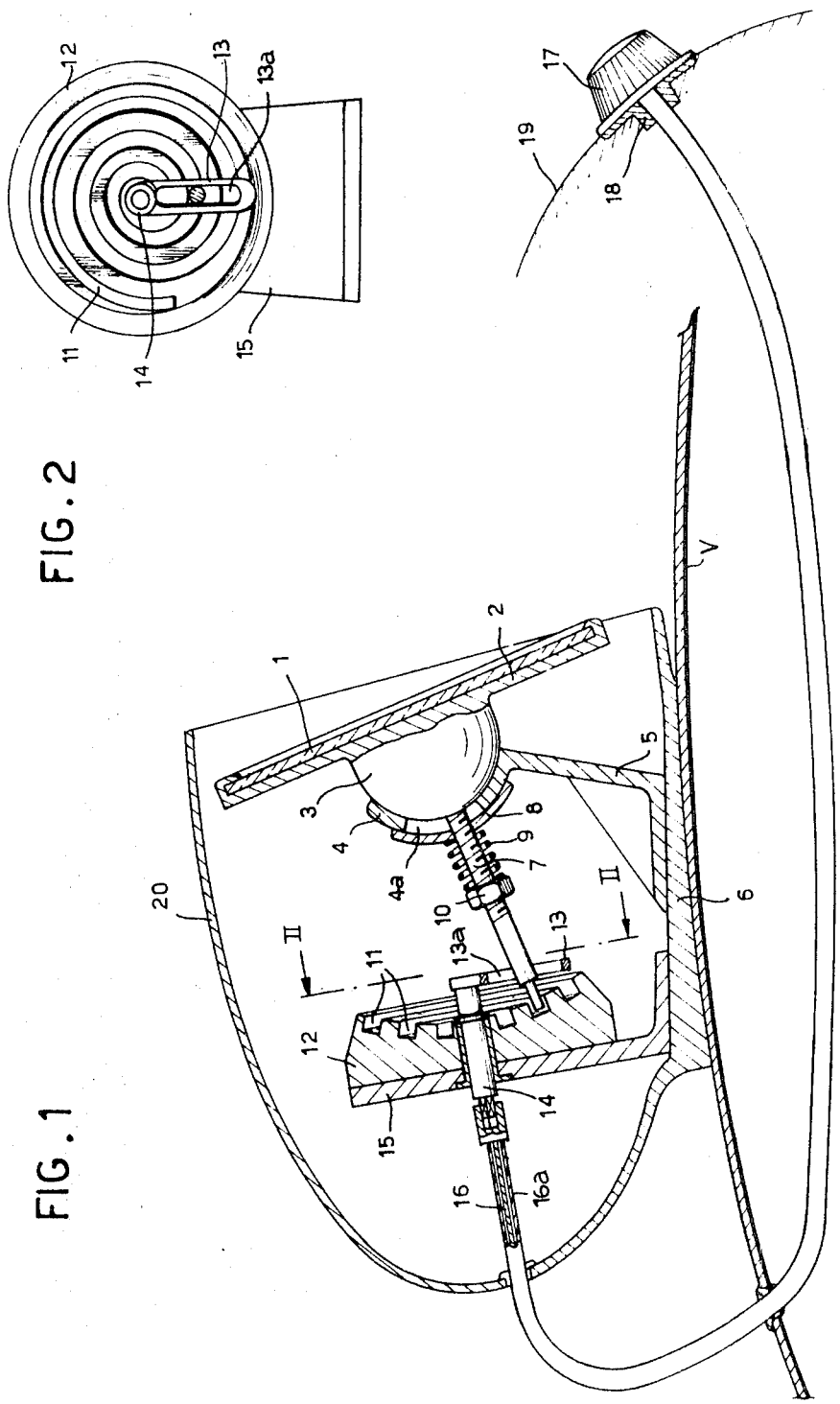

DEVICE FOR REMOTELY CONTROLLING THE SETTING OF A REARVIEW MIRROR

This invention relates to devices for remotely controlling the setting of rearview mirrors, particularly external driving mirrors on motor vehicles.

It is well known to mount an external driving mirror on a motor vehicle on a swivel joint so that the angular setting of the mirror can be adjusted to afford to the vehicle driver a satisfactory view to the rear and one side of the vehicle.

Since the setting of such a mirror may have to be varied, depending upon the height of the driver or his driving position adjustment of the mirror is frequently necessary.

Remote control systems for adjusting the setting of a driving mirror are known which employ a plurality of semiflexible cables interconnecting the mirror and a remote control member at the instrument panel on the vehicle. Angular displacements of the mirror may be effected by making corresponding angular displacements of the remote control member.

Such remote control systems are, however, elaborate and difficult in construction and, moreover, do not always afford accurate adjustment of the mirror setting. Furthermore, such systems are unreliable in operation, as failure of any one of the control cables makes the whole system inoperative.

An object of this invention is to obviate the above drawbacks by providing a remote control device for controlling the setting of a rearview mirror which is simple, sturdy and inexpensive in construction and which permits accurate adjustment of the mirror setting by a smooth and sensitive control.

The main characteristic feature of the remote control device according to the invention is that the device comprises a stationary plate arranged behind the mirror and provided in its face turned towards the mirror with a spiral groove in which a rod fast with the mirror engages, the rod being movable along the spiral groove by a crank member rotatable about a fixed axis by remote control means operable from a driver's position, the displacement of said rod along the spiral groove causing corresponding angular displacements of the mirror about the fulcrum of the swivel joint, thereby adjusting the angular setting of the mirror.

The device according to the invention is reliable and accurate in operation, and moreover tends to prevent angular displacement of the mirror from its selected setting due to the effect of vibrations.

The invention will be more clearly understood from the following detailed description, given by way of example only, with reference to the accompanying drawings, wherein:

FIG. 1 is a diagrammatic longitudinal sectional view of a device for remotely adjusting the setting of an external driving mirror on a motor vehicle, according to one embodiment of the invention;

FIG. 2 is a cross-sectional view on line II–II in FIG. 1, and

The same reference numerals are used throughout the drawings to designate the same or corresponding parts.

Figure 3:
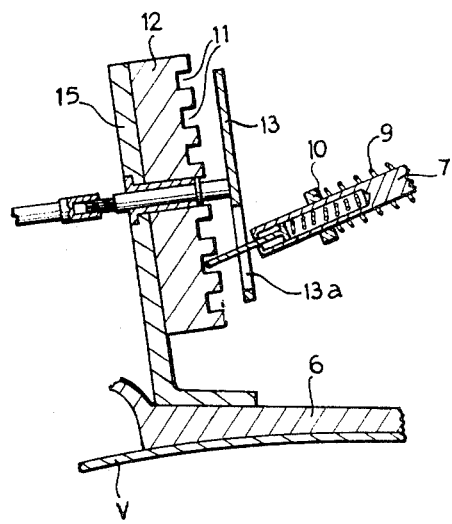
FIG. 3 is a diagrammatic longitudinal sectional view of part only of a device according to the invention, illustrating modifications of the device of FIG. 1.

The reflecting element 1 of an external rearview mirror unit is held in a rigid support 2. The mirror support 2 is formed at its rear with a semispherical boss 3 engaged in a part-spherical socket in a cap member 4 carried by a stationary supporting bracket 5. The bracket 5 is secured to a baseplate 6 which, in use of the mirror, is mounted on the vehicle body ahead of the driver's position, part of said vehicle body being indicated at V.

A rod 7 fast with the mirror extends rearwardly from the center of the boss 3. The outer surface of the cap member 4 is engaged by a washer 8 in the shape of a spherical cap. The cap washer 8 is acted upon by a helical spring 9 bearing at one end against an adjustable nut 10 which is screwed on a screw-threaded portion of the rod 7 and at its other end against the washer 8, so that the latter is urged into contact with the outer surface of the cap member 4.

The rod 7 passes through a hole 4a in the cap member 4, the hole 4a being considerably larger than the diameter of the rod 7 in order to permit angular movements of the mirror relative to the supporting bracket S in all directions, said movements being braked by the reaction of the spring 9 on the washer 8. By adjusting the position of the nut 10 the braking of the angular movement of the mirror, in other words, the tightness of the mirror swivel joint 3, 4, can be adjusted in a known manner.

The rearwardly extending rod 7 engages at its free end in a spiral groove 11 cut in a stationary disc-shaped plate 12 arranged behind the mirror and secured to a vertically extending support 15 fast with the baseplate 6. The plate 12 supports centrally a freely rotatable crank shaft 14 projecting from both opposite faces of the plate 12, the axis of the shaft 14 passing through the center of the spiral groove 11. At its end projecting towards the mirror the shaft 12 carries a crank member 13 in the form of an elongated arm provided with an elongated radially extending slot 13a in which the rod 7 is located.

The crank member 13 may alternatively be in the form of a rotatable disc (FIG. 3) attached to the crank shaft 14 formed with a radially elongated slot 13a in which the rod 7 is located, in an exactly analogous manner to the location of the rod 7 in the slot 13a of FIGS. 1 and 2.

The opposite end of the crank shaft 14, remote from the mirror, is connected to means for rotating the shaft. In the embodiment of FIGS. 1 and 2 said means comprise a flexible torque-transmitting element 16 rotatable in a semiflexible sheath 16a and connected at one end to the shaft 14 and at the other end to a rotatable operating knob 17 mounted on or near the instrument panel 19 on the vehicle, in a suitable bush 18.

All the components of the device mounted on the baseplate 6 are enclosed in a streamlined casing 20 which also partly shields the mirror.

By rotating the knob 17, the shaft 14 and crank member 13 are rotated about the axis of the shaft 14, displacing the rod 7 fast with the mirror along the spiral groove 11. Such displacements of the rod 7 cause corresponding angular displacements of the mirror about the fulcrum of its swivel joint, 3, 4.

Since the turns of the spiral groove 11 are centered upon the axis of rotation of the shaft 14, the angular setting of the mirror can be adjusted through a continuous range, in a sense depending upon the sense of rotation of the knob 17, until the desired setting of the mirror is reached.

Alternative forms of mechanical remote control for the shaft 14 and crank member 13 may be provided. Alternatively, the shaft 14 may be rotatable by means of an electric motor through a reducing gear, the motor being either mounted within the vehicle near the instrument panel 19, or within the casing 20 near the mirror.

In the embodiment of FIGS. 1 and 2, the face of the plate 12 formed with the spiral groove 11 is in axial section of a concave profile in the form of a spherical cap concentric with the fulcrum of the mirror swivel joint 3, 4. The distance between the bottom of the groove 11 and the fulcrum of the swivel joint 3, 4 is, therefore, constant in all angular settings of the mirror.

In an alternative arrangement, illustrated in FIG. 3, the spiral groove 11 is formed in a planar face of the plate 12, and the rod 7 is made telescopic so as to take up the variation in spacing between the bottom of the groove 11 and the fulcrum of the swivel joint 3, 4 as the mirror setting is changed.

With the above-described remote control device the setting of the mirror can be adjusted accurately in a simple and easy manner. Moreover, the mirror is prevented from moving away from its selected position by the effect of the vibrations to which it is subjected during movement of the vehicle.

The device is, furthermore, simple and inexpensive in construction as it is made up of a small number of component parts which are easy to assemble. The simplicity of construction affords reliability in operation and makes for a long life of the device.

It will be understood that constructional details of the device may be widely varied from the specific constructions illustrated without departing from the scope of the invention as defined in the claims.

What I claim is:

1. A rearview mirror unit adapted to be mounted on a motor vehicle, the unit comprising a bracket adapted to be fixed externally on said vehicle, a mirror element, means for mounting said mirror element on said bracket for swiveling movement so as to be capable of simultaneous movement about a horizontal and vertical axis, a plate connected to said bracket in spaced, substantially parallel relation to said mirror element and having a face formed with a generally spiral groove, a rod secured to said mirror element and extending toward said plate with the end thereof movably disposed in said groove to enable variation in the angular setting of said mirror element, a crank member mounted for rotation about an axis passing through the center of said spiral groove and disposed in engagement with said rod to move said rod in said spiral groove, and control means for rotating said crank member, said control means including an operating member adapted to be supported in the interior of said vehicle of operation by the driver of said vehicle.

2. A rearview mirror unit as set forth in claim 1 wherein said crank member includes a rotatable portion formed with a radial slot in which said rod is located.

3. A rearview mirror unit as set forth in claim 1 wherein the face of said plate in which the spiral groove is provided is in the form of a spherical cap concentric with the center of the means for mounting said mirror element for swiveling movement.

4. A rearview mirror unit as set forth in claim 1 wherein the face of said plate in which the spiral groove is provided is planar and the rod which is secured to said mirror and engaged in said spiral groove is telescopic.